(12) United States Patent
Shen

(10) Patent No.: US 8,787,979 B2
(45) Date of Patent: Jul. 22, 2014

(54) METHOD AND TERMINAL FOR DISPLAYING CELL PHONE MENU WITH PERSONALIZED SETTING

(75) Inventor: Guangcai Shen, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 27 days.

(21) Appl. No.: 13/258,417

(22) PCT Filed: Mar. 10, 2010

(86) PCT No.: PCT/CN2010/070970
§ 371 (c)(1),
(2), (4) Date: Dec. 22, 2011

(87) PCT Pub. No.: WO2010/145226
PCT Pub. Date: Dec. 23, 2010

(65) Prior Publication Data
US 2012/0100894 A1 Apr. 26, 2012

(30) Foreign Application Priority Data

Jun. 29, 2009 (CN) .......................... 2009 1 0151037

(51) Int. Cl.
*H04W 88/02* (2009.01)
*H04M 1/725* (2006.01)
*G06F 3/0482* (2013.01)

(52) U.S. Cl.
CPC ...... *H04M 1/72583* (2013.01); *H04M 1/72563* (2013.01); *G06F 3/0482* (2013.01)
USPC .......................................... 455/566; 715/713

(58) Field of Classification Search
USPC ............ 345/600; 455/566; 715/713, 733, 810
See application file for complete search history.

(56) References Cited

U.S. PATENT DOCUMENTS

2002/0085017 A1* 7/2002 Pisutha-Arnond et al. ... 345/660
2002/0085027 A1* 7/2002 Kim .............................. 345/738
(Continued)

FOREIGN PATENT DOCUMENTS

CN 101067777 A 11/2007
CN 101166324 A 4/2008
(Continued)

OTHER PUBLICATIONS

International Search Report for PCT/CN2010/070970 dated Jun. 2, 2010.

*Primary Examiner* — Myron K Wyche
(74) *Attorney, Agent, or Firm* — Ling Wu; Stephen Yang; Ling and Yang Intellectual Property LLC

(57) ABSTRACT

A method and terminal for displaying a cell phone menu with personalized setting are provided. The method comprises: when a cell phone receives a request for modifying a position of a menu item, recording an ID of the menu item and information of a source menu, and after the user determines a new position, recording position information S1 in a destination menu; and after the cell phone receives a request for viewing a menu, determining whether the menu is a destination menu or a source menu; if not, displaying each menu item in the menu; if the menu is the destination menu, displaying a corresponding menu item in the position S1 and displaying menu items contained in the menu in other positions; if the menu is the source menu, displaying other menu items except the corresponding menu item contained in the menu according to the menu tree.

9 Claims, 3 Drawing Sheets

(56) References Cited

U.S. PATENT DOCUMENTS

| | | |
|---|---|---|
| 2004/0237051 A1 | 11/2004 | Clauson |
| 2005/0053241 A1* | 3/2005 | Fan et al. ............... 380/270 |
| 2007/0198928 A1 | 8/2007 | Tseng |
| 2009/0055868 A1* | 2/2009 | Wehmeyer et al. ............ 725/40 |
| 2009/0144628 A1* | 6/2009 | Stevens et al. ............... 715/733 |

FOREIGN PATENT DOCUMENTS

| | | |
|---|---|---|
| CN | 101594430 | 12/2009 |
| EP | 1936482 A1 | 6/2008 |

* cited by examiner

METHOD AND TERMINAL FOR DISPLAYING CELL PHONE MENU WITH PERSONALIZED SETTING

TECHNICAL FIELD

The present invention relates to the field of mobile phones, and more particularly, to a method and terminal for displaying a cell phone menu with personalized setting.

BACKGROUND OF THE RELATED ART

With the increasing popularity of cell phones, personalization requirements of users are becoming higher and higher. However, in the prior art, since menus displayed on most cell phones are regulated by cell phone manufacturers, the users cannot change styles and designs of the menus according to personal preferences. Sometimes, when a user who is accustomed to use one cell phone replaces it with a new cell phone, she/he will find that the organization order and manner of a menu in the new cell phone are greatly different from those in the old cell phone, and thus the new cell phone is very difficult to use.

CONTENT OF THE INVENTION

A technical problem to be solved by the present invention is to provide a method and terminal for displaying a cell phone menu with personalized setting so as to overcome the defect that users cannot set positions of menu items freely.

In order to solve the aforementioned technical problem, the present invention provides a method for displaying a cell phone menu with personalized setting comprising:

when a cell phone receives a request for modifying a position of a menu item initiated by a user, recording an identification (ID) of the menu item and information of a source menu to which the menu item belongs, and after the user determines a new position, recording position information S1 selected by the user in a destination menu; and after the cell phone receives a request for viewing a menu from the user, determining whether the menu is a destination menu or a source menu stored in the cell phone; if not, displaying each menu item in the menu according to a menu tree stored in the cell phone; if the menu is the destination menu, displaying a corresponding menu item in the position S1, and displaying menu items contained in the menu in other positions according to the menu tree; if the menu is the source menu, displaying other menu items except the corresponding menu item contained in the menu according to the menu tree.

Furthermore, the method may also have the following feature:

the information of the source menu to which the menu item belongs is an ID of the menu to which the menu item currently belongs, and the position information S1 selected by the user in the destination menu comprises an ID of the destination menu and an item number selected by the user in the destination menu.

Furthermore, the method may also have the following feature:

an empty menu management file, which is used to store an ID, source position information and destination position information of a menu item to be moved, is preset in the cell phone; wherein the source position information is source menu information of the menu item to be moved, and the destination position information is the position information S1 of the menu item to be moved in the destination menu.

Furthermore, the method may also have the following feature:

after the cell phone receives the request for viewing the menu from the user, the method further comprises:

determining whether the menu management file is empty, if yes, determining directly that the menu is not a destination menu or a source menu stored in the cell phone;

if not, determining whether the menu is the destination menu or the source menu stored in the cell phone based on contents stored in the menu management file.

Furthermore, the method may also have the following feature:

the menu management file organizes the source position information and the destination position information of the menu item to be moved using a form of nodes, each node corresponding to the ID, the source menu information and the destination position information of the menu item to be moved.

Furthermore, the method may also have the following feature:

a remaining idle node parameter is set in the file management menu; when the cell phone is delivered from a factory, the value of the parameter is a positive integer; whenever a piece of node information is recorded, one is subtracted from the value of the parameter; when the value of the parameter is 0, the node information will not be recorded any more.

Furthermore, the method may also have the following feature:

when the cell phone receives the request for modifying the position of the menu item initiated by the user, the method further comprises:

determining whether the ID of the menu item is stored in the menu management file;

if yes, after the user determines the new position, replacing directly the destination position information corresponding to the ID of the menu item in the menu management file with destination position information specified by the user this time;

if not, recording the ID of the menu item and the information of the source menu to which the menu item belongs and executing the subsequent process.

In order to solve the technical problem described above, the present invention provides a terminal for displaying a cell phone menu with personalized setting comprising a receiving module, a first memory module, a second memory module, a determining module and a display module; wherein the receiving module is configured to send a first storage command to the second memory module after receiving a request for modifying a position of a menu item initiated by a user; send a second storage command to the second memory module after receiving a position determination message sent by the user; and send a determining command to the determining module after receiving a request for viewing a menu from the user;

the first memory module is configured to store a menu tree of the terminal;

the second memory module is configured to store an identification (ID) of the menu item and information of a source menu to which the menu item belongs after receiving the first storage command; and store position information S1 selected by the user in a destination menu after receiving the second storage command;

the determining module is configured to determine whether the menu that the user requests to view is a destination menu or a source menu stored in the second memory module after receiving the determining command; if not, send a normal display command to the display module; if the menu is the destination menu, send a moving-in display command to the display module; and if the menu is the source menu, send a moving-out display command; and the display module is configured to display each menu item in the menu according to the menu tree stored in the first memory module after receiving the normal display command; display a corresponding menu item in the position S1 after receiving the moving-in display command, and display menu items contained in the menu in other positions according to the menu tree; and display other menu items except the corresponding menu item contained in the menu according to the menu tree after receiving the moving-out display command.

Furthermore, the terminal may also have the following feature:

the information of the source menu to which the menu item belongs is an ID of the menu to which the menu item currently belongs, and the position information S1 selected by the user in the destination menu comprises an ID of the destination menu and an item number selected by the user in the destination menu.

Furthermore, the terminal may also have the following feature:

the second memory module organizes the source position information and the destination position information of the menu item to be moved using a form of nodes, each node corresponding to the ID, the source menu information and the destination position information of the menu item to be moved.

Furthermore, the terminal may also have the following feature:

the second memory module is configured to store the ID of the menu item and the information of the source menu to which the menu item belongs after receiving the first storage command means that:

the second memory module is configured to determine whether the ID of the menu item is stored in the second memory module after receiving the first storage command; if yes, replace directly the destination position information corresponding to the ID of the menu item in the second memory module with destination position information specified by the user this time after receiving the second storage command; if not, record the ID of the menu item and the information of the source menu to which the menu item belongs.

The present invention has the following remarkable advantages:

Firstly, on the premise that frameworks of software and hardware of the existing cell phone are unchanged, only small changes are required to be made to a MMI (Man Machine Interface).

Secondly, the user can performs simply operations on the cell phone to achieve personalized menus without using any external device or server.

PREFERRED EMBODIMENTS OF THE PRESENT INVENTION

The technical scheme of the present invention will be described in further detail in conjunction with the accompanying figures and embodiments.

Typically, when a cell phone is delivered from a factory, the manufacturer will pre-store a menu tree, a menu performance function mapping table and menu performance function information in the cell phone, which cannot be modified by a user. The menu tree is in an organization form of cell phone menus, and the cell phone displays each menu item in the corresponding position according to the menu tree. A one to one correspondence between each menu item and its performance function is stored in the menu performance function mapping table. When the user selects a menu item, the cell phone will search for the menu performance function corresponding to the menu item in the menu performance function mapping table, and call the function to execute the corresponding action.

Figure 1:
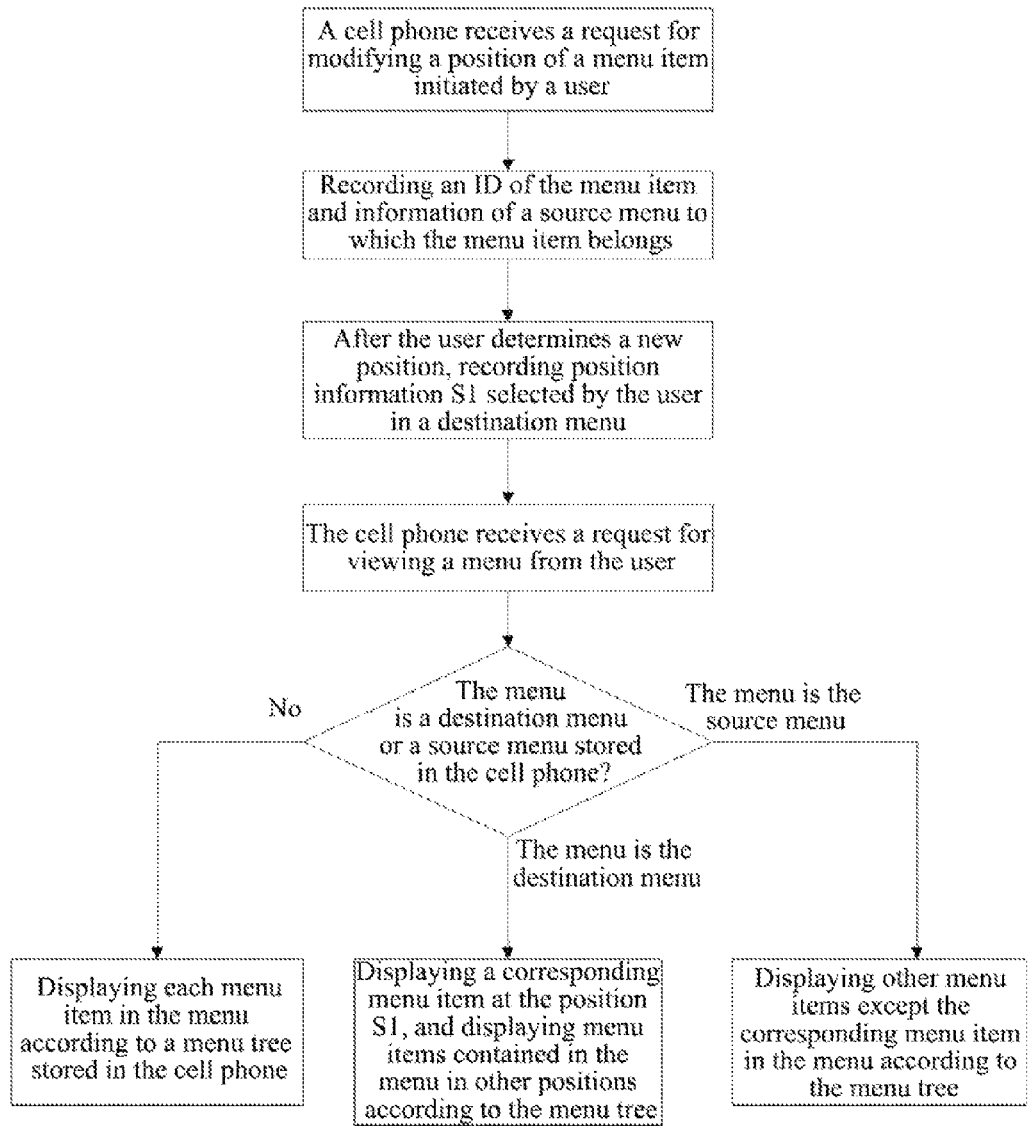
FIG. 1 is a flow chart of a method for displaying a cell phone menu with personalized setting in accordance with an embodiment of the present invention.

As shown in FIG. 1, the basic concept of the present invention will be described now. When the cell phone receives a request for modifying a position of a menu item initiated by a user, it records an ID of the menu item and information of a source menu to which the menu item belongs, and after the user determines a new position, records position information S1 selected by the user in a destination menu. After the cell phone receives a request for viewing a menu from the user, it determines whether the menu is a destination menu or a source menu stored in the cell phone; if not, displays each menu item in the menu according to the menu tree stored in the cell phone; if the menu is the destination menu, displays the corresponding menu item in the position S1, and displays menu items contained in the menu in other positions according to the menu tree; if the menu is the source menu, displays other menu items except the corresponding menu item contained in the menu according to the menu tree.

The information of the source menu to which the menu item belongs may be an ID of the menu to which the menu item currently belongs, and the position information S1 selected by the user in the destination menu comprises an ID of the destination menu and an item number (i.e., series number) selected by the user in the destination menu.

In specific implementation, an empty menu management file is preset in a cell phone when the cell phone is delivered from a factory. After the user initiates a request for modifying a position of a menu item, the source menu information and the position information S1 in the destination menu may be stored in the menu management file. When the cell phone receives a request from the user for viewing a menu, it is first determined whether the menu management file is empty, if yes, it is shown that the position of the menu item has not been modified yet, each menu item in the menu is displayed directly according to the menu tree stored in the cell phone; if not, it is further determined whether the menu is the stored destination menu or source menu according to contents stored in the menu management file.

Figure 2:
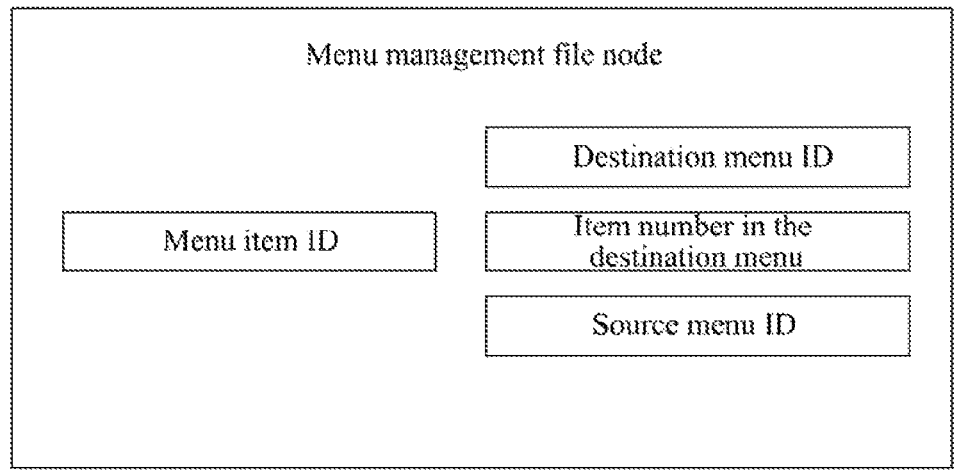
FIG. 2 is a structural diagram of a node in a menu management file in accordance with an embodiment of the present invention.

In addition, the menu management file may organize source position information (i.e., source menu information) and destination position information of the menu item to be moved using a form of nodes. As shown in FIG. 2, each node corresponds to the ID of the menu item to be moved, information of the source menu to which the menu item belongs (the ID of the source menu) and its destination position information (the ID of the destination menu and the item number in the destination menu).

Figure 3:
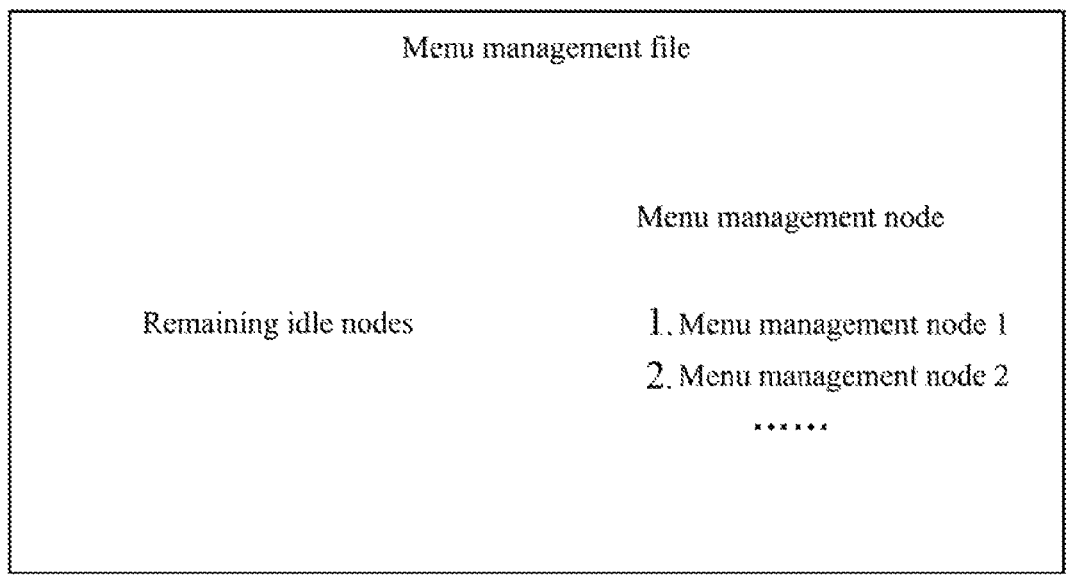
FIG. 3 is a structural diagram of a menu management file in accordance with an embodiment of the present invention.

According to the foregoing description, whenever a menu item is moved, the cell phone will record some relevant information, which will occupy some storage space. Therefore, considering the problem of limited storage capacity in the cell phone, as shown in FIG. 3, a remaining idle node parameter may be set in the menu management file. When the cell phone is delivered from a factory, the value of the parameter is a positive integer. Whenever one piece of node information is recorded, one is subtracted from the value of the parameter. When the value of the parameter is 0, the node information will not be recorded any more, that is, the relevant information regarding the movement of the menu item will not be recorded any more, and at this point the menu item can not be moved.

Furthermore, when one menu item is moved for many times, in order to save the storage space, it is first determined whether the ID of the menu item is stored in the menu management file after the request for modifying the position of the menu item initiated by the user is received; and if yes, the destination position information corresponding to the ID of the menu item in the menu management file is replace directly with the destination position information specified by the user this time after the user selects the destination position; otherwise, the ID of the menu item and the information of the source menu to which the menu item belongs are recorded, and the subsequent process is executed.

To sum up, it can be seen that the present invention can be applied to not only the cell phone but also any terminal display system, such as a Personal Handy-Phone System (PHS), that contains a MMI.

Figure 4:
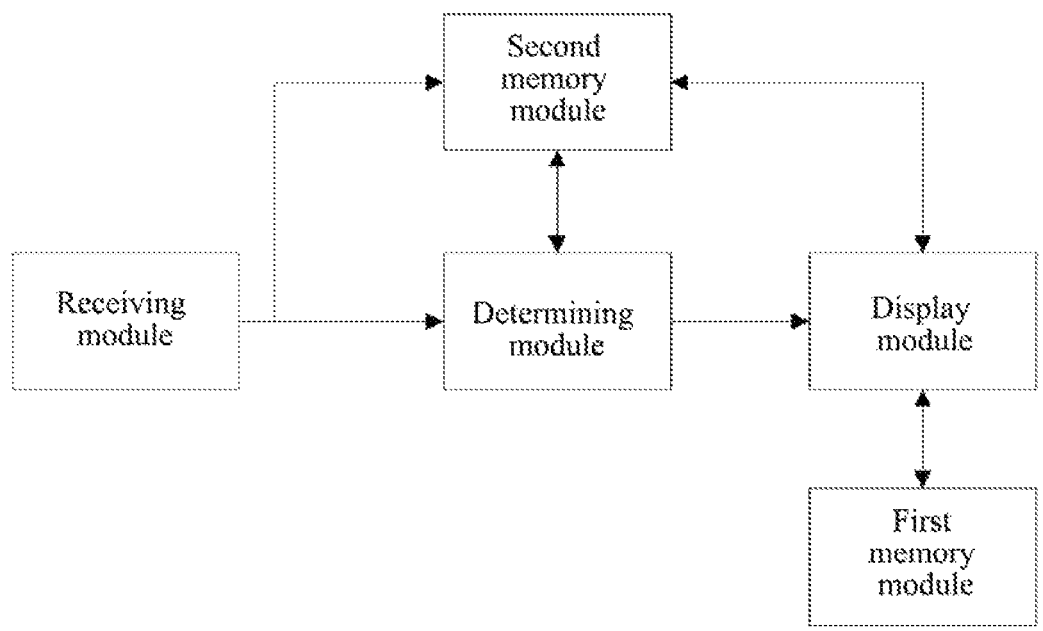
FIG. 4 is a block diagram of a terminal for displaying a cell phone menu with personalized setting in accordance with an embodiment of the present invention.

In addition, the present invention also provides a terminal for displaying a cell phone menu with personalized setting, which, as shown in FIG. 4, comprises a receiving module, a first memory module, a second memory module, a determining module and a display module.

The receiving module is configured to send a first storage command to the second memory module after receiving a request for modifying a position of a menu item initiated by a user; send a second storage command to the second memory module after receiving a position determination message sent by the user; and send a determining command to the determining module after receiving a request for viewing a menu from the user.

The first memory module is configured to store a menu tree of the terminal.

The second memory module is configured to store an identification (ID) of the menu item and information of a source menu to which the menu item belongs after receiving the first storage command; and store position information S1 selected by the user in a destination menu after receiving the second storage command.

The determining module is configured to determine whether the menu that the user requests to view is a destination menu or a source menu stored in the second memory module after receiving the determining command; if not, send a normal display command to the display module; if the menu is the destination menu, send a moving-in display command to the display module; and if the menu is the source menu, send a moving-out display command.

The display module is configured to display each menu item in the menu in the menu tree stored in the first memory module after receiving the normal display command; display a corresponding menu item in the position S1 after receiving the moving-in display command, and display menu items contained in the menu in other positions according to the menu tree; and display other menu items except the corresponding menu item contained in the menu according to the menu tree after receiving the moving-out display command.

The information of the source menu to which the menu item belongs is an ID of the menu to which the menu item currently belongs, and the position information S1 selected by the user in the destination menu comprises an ID of the destination menu and an item number selected by the user in the destination menu.

The second memory module organizes the source position information and the destination position information of the menu item to be moved using a form of nodes, each node corresponding to the ID, the source menu information and the destination position information of the menu item to be moved.

The second memory module is configured to store the ID of the menu item and the information of the source menu to which the menu item belongs after receiving the first storage command means that the second memory module is configured to determine whether the ID of the menu item is stored in the second memory module after receiving the first storage command; if yes, replace directly the destination position information corresponding to the ID of the menu item in the second memory module with destination position information specified by the user this time after receiving the second storage command; if not, record the ID of the menu item and the information of the source menu to which the menu item belongs.

Although the present invention is described in conjunction with the specific embodiments, modifications and variations may be made by those skilled in the art without departing from the spirit or scope of the present invention. Such modifications or variations are regarded as within the scope of the present invention and the scope of the appended claims.

INDUSTRIAL APPLICABILITY

The present invention provides a method and terminal for displaying a cell phone menu with personalized setting so as to display the menu whose position has been modified by recording source position information and destination position information of the menu item to be moved. The present invention allows a user to set freely the position of the menu item such that the user can perform simple operations on the cell phone to achieve personalized menus.

What is claimed is:

1. A method for displaying a cell phone menu with personalized setting comprising:

when a cell phone receives a request from a user for modifying a position of a menu item of a source menu, the cell phone recording a first corresponding relation between the menu item identification (ID) of the menu item and the menu ID of the source menu; wherein, the cell phone has multiple menus, each menu has several menu items, modifying a position of a menu item of a source menu includes deleting the menu item from the source menu or moving the menu item from the source menu to a destination menu;

after the menu item is moved to a new position of the destination menu, the cell phone recording a second corresponding relation between the menu item ID, the menu ID of the destination menu and a position S1 of the new position; and after the cell phone receives a request for viewing a menu from the user, the cell phone determining whether the menu is one of the destination menus or source menus stored in the cell phone; if not, the cell phone displaying the menu items contained in the menu according to the menu tree organized and stored in the cell phone;

if the menu is one of the destination menus, the cell phone displaying the menu item in the position S1 according to the second corresponding relation, and displaying other menu items which are originally contained in the destination menu according to the menu tree of the destination menu;

if the menu is one of the source menus, the cell phone displaying the menu items in the source menu according to the menu tree of the source menu except the menu items contained in the first corresponding relation.

2. The method according to claim 1, further comprising:
presetting in the cell phone a menu management file which is empty when the cell phone is delivered to the user from a service provider; and
wherein the step of the cell phone recording a first corresponding relation and a second corresponding relation comprises: the cell phone storing the first corresponding relation and the second corresponding relation in the menu management file.

3. The method according to claim 2, wherein, the step of determining whether the menu is one of the destination menus or source menus stored in the cell phone comprises:
determining whether the menu management file is empty,
if yes, determining directly that the menu is neither a destination menu or a source menu;
if not, determining whether the menu is the destination menu or the source menu based on contents stored in the menu management file.

4. The method according to claim 2, further comprising:
organizing the first corresponding relation and the second corresponding relation stored in the menu management file using a form of nodes, wherein each node corresponds to one menu item ID and the corresponding menu ID of the source menu, or corresponds to one menu item ID and the corresponding menu ID of the source menu, the corresponding menu ID of the destination menu and the corresponding position.

5. The method according to claim 4, further comprising:
setting a remaining idle node parameter as a positive integer in the file management menu when the cell phone is delivered from the service provider;
whenever one node is used to record, subtracting from the value of the parameter by one; until the value of the parameter is 0, not recording the information any more.

6. The method according to claim 2, when the cell phone receives the request from the user for modifying the position of the menu item of the source menu, the method further comprises:
determining whether the menu item ID is stored in the menu management file;
if yes, after the user determines another new position of another destination menu, replacing directly the menu ID of the destination menu and the position corresponding to the menu item ID in the menu management file with the menu ID of the another destination menu and the another new position.

7. A terminal for displaying a cell phone menu with personalized setting comprising a receiving module, a first memory module, a second memory module, a determining module and a display module; wherein the receiving module is configured to send a first storage command to the second memory module after receiving a request from a user for modifying a position of a menu item of a source menu; send a second storage command to the second memory module after the menu item is moved to a new position of a destination menu; and send a determining command to the determining module after receiving a request for viewing a menu from the user; wherein, the terminal has multiple menus, each menu has several menu items, modifying a position of a menu item of a source menu includes deleting the menu item from the source menu or moving the menu item from the source menu to the destination menu;

the first memory module is configured to store menu trees of the menus in the terminal;

the second memory module is configured to store a first corresponding relation between menu item identification (ID) of the menu item and
the menu ID of the source menu after receiving the first storage command; and store a second corresponding relation between the menu item ID, the menu ID of the destination menu and a position S1 of the new position after receiving the second storage command;

the determining module is configured to determine whether the menu that the user requests to view is one of the destination menus or source menus stored in the second memory module after receiving the determining command; if not, send a normal display command to the display module; if the menu is one of the destination menus, send a moving-in display command to the display module; and if the menu is one of the source menus, send a moving-out display command; and the display module is configured to display the menu items contained in the menu according to the menu tree stored in the first memory module after receiving the normal display command; display the menu item in the position S1 according to the second corresponding relation and display other menu items which are originally contained in the destination menu according to the menu tree of the destination menu after receiving the moving-in display command; and display the menu items in the source menu according to the menu tree of the source menu except the menu items contained in the first corresponding relation after receiving the moving-out display command.

8. The terminal according to claim 7, wherein:
the second memory module can be a menu management file which is empty when the cell phone is delivered to the user from a service provider.

9. The terminal according to claim 7, wherein:
the second memory module is further configured to determine whether the menu item ID is stored in the second memory module after receiving the first storage command; if yes, after the user determines another new position of another destination menu, replace directly the menu ID of the destination menu and the position corresponding to the menu item ID with the menu ID of the another destination menu and the another new position.

* * * * *